Oct. 12, 1965  F. H. MUELLER ETAL  3,211,173
COMBINED SERVICE T AND EXCESSIVE-FLOW SAFETY VALVE
Filed Nov. 15, 1961  2 Sheets-Sheet 1

INVENTORS
FRANK H. MUELLER
LAWRENCE F. LUCKENBILL

BY *Cushman, Darby & Cushman*
ATTORNEYS

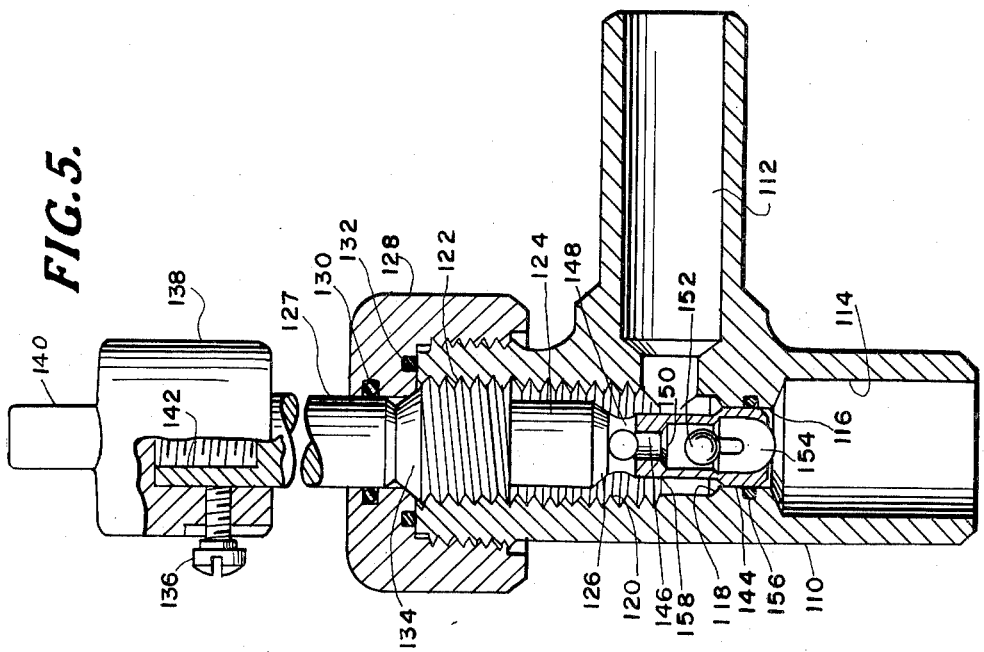
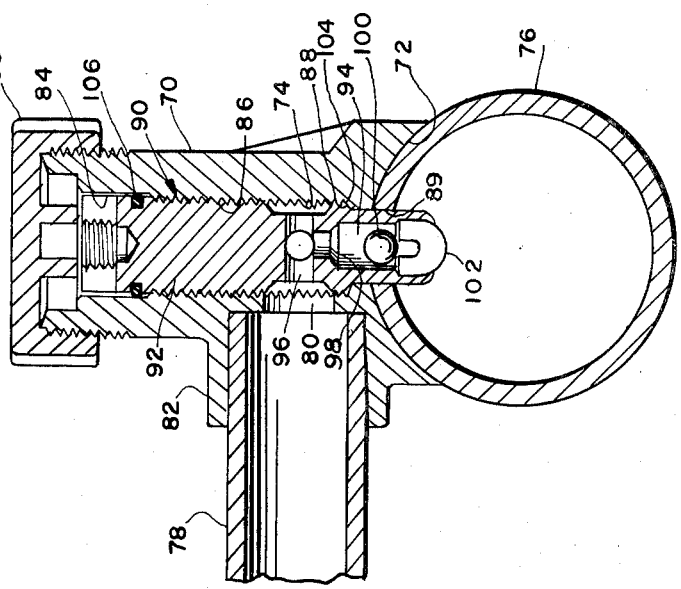
INVENTORS
FRANK H. MUELLER
LAWRENCE F. LUCKENBILL
BY Cushman, Darby & Cushman
ATTORNEYS

United States Patent Office 3,211,173
Patented Oct. 12, 1965

3,211,173
COMBINED SERVICE T AND EXCESSIVE-FLOW
SAFETY VALVE
Frank H. Mueller and Lawrence F. Luckenbill, Decatur,
Ill., assignors to Mueller Co., Decatur, Ill., a corporation of Illinois
Filed Nov. 15, 1961, Ser. No. 152,507
17 Claims. (Cl. 137—454.5)

This invention relates to improvements in service T's used to connect a street main with a service line to supply a dwelling with gas or water. More particularly, this invention relates to novel adaptations to service T's of an excessive-flow safety valve of the type disclosed in the patent to Jerman 2,569,316.

The Jerman patent discloses a tubular valve body having a flow passage extending therethrough and a valve seat adjacent one end of said passage. Disposed in the passage and seatable against the seat to shut off flow through the passage is a ball valve of magnetic material. The ball is normally maintained unseated by a permanent magnet spaced from the seat. The ball creates a restriction in the passageway, however, so that on the occurrence of flow in the passageway over a predetermined rate, the magnetic force is overcome and the ball moves away from the magnet into seating engagement with the seat. Such excessive flow safety valve is extremely compact, is formed of a minimum of parts with consequent economies of manufacture, and can be reset merely by equalization of the pressure differential across the ball valve when the latter is seated.

Service T's are in the form of a T body, have a through bore and a lateral outlet. One end of the T, i.e., an inlet end of the bore, is adapted to be secured radially to a main and the latter drilled in alignment with the bore so as to permit flow to take place from the main through the bore to the lateral outlet, to which a service line is connected. The opening in the main normally is accomplished by a drilling operation performed by a suitable tool inserted into the bore from its other end. After the drilling operation is completed, the other end of the bore normally is blocked by a threaded closure plug.

Obviously, an excessive flow safety valve, of the type disclosed in the aforementioned Jerman patent, possesses considerable utility when installed in a service T, because such safety valve will prevent escape of gas in the event of rupture of the service line or house piping, or in any situation which otherwise would result in the escape of an undue quantity of gas at any point beyond the T.

Accordingly, it is an object of this invention to incorporate an excessive flow safety valve in a service T with a minimum of modification of the normal structure of such a T and consequently at minimum expense.

It is another object of this invention to provide a service T with an excessive flow safety valve that is embodied in an assembly which performs dual functions, i.e., that of a safety valve and that of a closure plug for blocking the outer end of the T through bore.

In some instances, a service T is provided with a valve that has a stem projecting out of the outer end of the through bore for access by an appropriate turning tool. Such stem frequently is enclosed in a tubular protective box extending from the surface of the ground down to the T so as to permit ready accessibility of the valve stem. Service T's of this type frequently are termed curb valve T's because they are located adjacent a street curb.

Accordingly, it is another object of this invention to provide a curb valve T with a novel assembly of an excessive flow safety valve.

It is a further object of this invention to provide a curb valve T with an excessive flow safety valve wherein the valve can be reset readily by simple manipulations of the valve stem.

It is a further object of this invention to provide structural improvements in an excessive flow safety valve of the type disclosed in the aforementioned Jerman patent.

Other objects and advantages of the invention will become apparent from the following description and accompanying drawings in which:

FIGURE 4 is a vertical sectional view of a modified form of service T embodying this invention.

FIGURE 5 is a vertical sectional view of a curb valve T embodying this invention.

Figure 1:
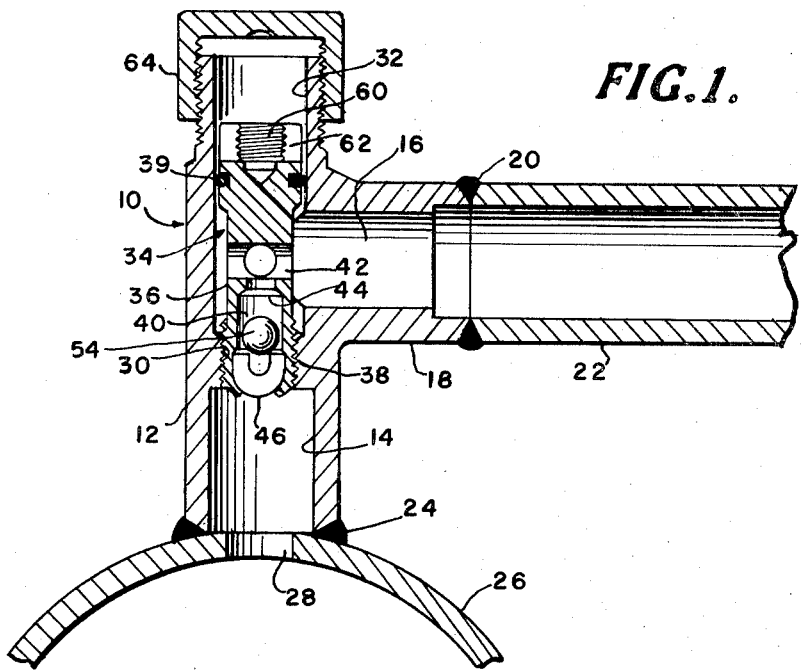
FIGURE 1 is a vertical sectional view illustrating a service T embodying this invention connecting a service line with a main.

Referring now to FIGURE 1 of the drawings there is shown a service T 10 having a T body 12 which is provided with a through bore 14 and a lateral outlet 16, the latter normally being surrounded by an exterior boss 18 to which is connected, as by welding 20, a service line 22. The T body 12, at one end of the through bore 14, which may be termed an inlet end 15, is secured, as by welding 24, to a street main 26, for example, a gas main. An opening 28 is formed in the wall of the main 26 in alignment with the T bore 14 in order to allow gas to flow from the main into the bore, and thence through the lateral outlet 16 into the service line 22. In the embodiment of the invention illustrated in FIGURE 1, the opening 28 normally is formed, after the T 10 is welded to the main without the escape of gas to the atmosphere by appropriate drilling apparatus (not shown) secured to the other end of the T and which includes a drill (not shown) operable through the T bore 14. Such apparatus is well-known in the art so that no further description thereof is necessary here.

In another type of installation, which is not shown here but is termed machine-inserted, the T has exterior threads on its inlet end and is secured in a tapped opening in a main, such opening being formed by appropriate apparatus (not shown) well-known in the art. The T is threaded into such opening by means of appropriate known apparatus which prevents escape of fluid from the main to the atmosphere. It will be understood that the invention disclosed herein is likewise adaptable to such a machine-inserted service T, as contrasted to a service T which is welded to a main and has service subsequently established by means of a drilling operation.

Between its inlet end and the lateral outlet 16, the T bore 14 is provided with a short threaded section 30 of a diameter somewhat less than that of the diameter of the bore on opposite sides of such section. Above the lateral outlet 16 the bore is provided with a smooth surface 32. Disposed in the T bore 14, and extending from one side of the lateral outlet 16 to the other, is an assembly 34 comprising a combined excessive-flow safety valve and plug for blocking the T bore above the lateral outlet. The assembly 34 includes a generally cylindrical member 36 having an open lower or inner end and a closed upper or outer end. The lower end of the member 36 is provided with exterior threads 38 engaged with those in the T threaded bore section 30. Preferably, the threads 30 and 38 are iron pipe threads, which converge or taper downwardly so that when the member 36 is screwed tightly into the T bore section 30, a tight seal will be formed by the mating threads. At its upper end, the member 36 is provided with an external circumferential groove within which is disposed a pressure-deformable resilient sealing ring 39 which protrudes somewhat outwardly from the groove into engagement with the smooth-surface bore section 32 for sealing engagement therewith. Desirably, the sealing ring 39 is in the form of the well-known O-ring.

Figure 2:
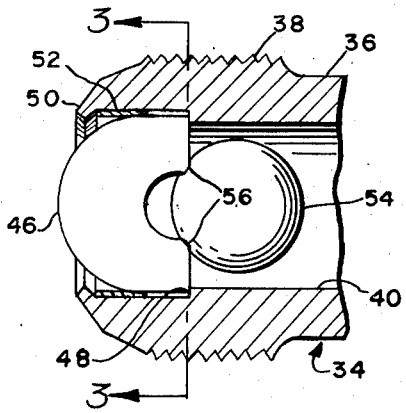
FIGURE 2 is an enlarged fragmentary view of a portion of FIGURE 1 illustrating structural details.
Figure 3:
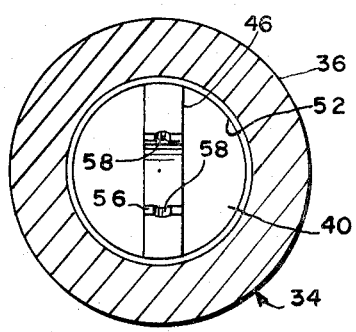
FIGURE 3 is a sectional view taken substantially on line 3—3 of FIGURE 2.

Extending upwardly and into the member 36 from the lower end thereof is a bore forming a flow passage 40 that terminates at its upper end in one or more radial or lateral ports 42 that are in communication with the lateral outlet 16. Preferably, the member 36 is reduced in diameter, in a section which includes the ports 42, in order to assure unrestricted communication between the latter and the lateral outlet 16. Immediately in advance of the lateral ports 42, the passage 40 is reduced to form a downwardly facing shoulder that defines a valve seat 44. Disposed in the lower end of the passage 40 is a generally U-shaped permanent magnet 46 having the outer marginal edge portions of the arms thereof engaged against a downwardly facing shoulder 48 formed in the passage, as best shown in FIGURE 2. The magnet 46 is retained in such position in the passage by an inturned flange 50 at the lower end of the member 36, such flange being formed by a crimping or spinning operation. Preferably, the magnet 46 is retained in place in the passage 40, prior to the spinning or crimping operation, by a short sleeve 52 frictionally engaged between the curved outer base portion of the magnet and the wall of the passage 40. The smaller transverse dimension of the magnet 46 is less than the diameter of the passage 40 so as to permit the flow of fluid past the magnet, as shown in FIGURE 3.

Normally seated against the arms of the magnet 46, which constitute the two poles thereof, and retained in such engagement by magnetic force, is a magnetic ball valve 54, of steel or other appropriate magnetic material. The valve 54 is of a size to cooperate with the valve seat 44 so as to shut off flow through the passage 40 when seated. It will be seen that the ball valve 54 creates a restriction in the flow passage 40 so that when flow therethrough reaches a predetermined value there will be a pressure drop across the ball. When such pressure drop or differential creates a force on the ball 54 sufficient to overcome the attractive force of the magnet 46, the ball will be released from the latter and will be carried by the fluid flow into seating engagement with the valve seat 44. The ball 54 will be retained on the seat 44 by the resulting pressure differential across the ball caused by its shutting off flow through the passageway 40. Preferably, the opposed edges of the two magnet arms are bevelled, as shown at 56 in FIGURES 2 and 3, and each bevelled portion is provided with a groove 58 having a bottom curved with the same radius of curvature as the ball 54. This construction provides for increased contact between the ball 54 and the magnet 46 so that the magnetic circuit is more effectively closed to preserve the effective life of the magnet. The shaping of the magnet arms to even somewhat conform to the ball 54 results in further benefits. When the passageway 40 is horizontal and the weight of the ball 54 is large in relation to the attractive force of the magnet 46 thereon, the "conformance" shaping minimizes any tendency of the ball to slide down on the arms into a position off-center with respect to the passageway 40. The "conformance" also inhibits side-to-side "rattling" movements of the ball 54 along the edges of the magnet arms caused by flow of fluid past the ball.

The upper closed end of the member 36 is provided with an interiorly threaded socket 60 having a transverse kerf 62 in the rim thereof. The socket 60 and the kerf 62 enable the member 36 to be connected to the end of an appropriate tool, known in the art, which can be used in conjunction with apparatus of the type previously mentioned to insert the assembly 34 after the aforedescribed drilling operation has been completed. In order to complete the installation, a closure cap 64 normally is threaded onto the upper end of the T body 12.

From the foregoing construction, it will be seen that the assembly 34 normally permits gas to flow from the main 26 into the service line 22, but should flow in the latter become excessive for any reason, the ball 54 will be moved upwardly from the magnet 46 into engagement with the valve seat 44 and shut off further flow into the service line. The resulting pressure differential across the ball valve 54 will retain the same in engagement with its seat 44 until such pressure differential is equalized. This can be accomplished by appropriate repair of the service line 22 or correction of any other situation which resulted in the excessive flow, and subsequent introduction into the line of fluid, such as air, under pressure, sufficient to accomplish the necessary equalization of the differential pressure across the ball valve 54. On such equalization, the ball 54 will drop and be drawn back into its retaining engagement with the magnet 46.

Referring now to FIGURE 4 of the drawings there is shown an adaptation of the invention for use with a plastic service T of the type disclosed in the patent to Mueller No. 2,839,075. In this modification, the service T body 70 is formed of plastic and has a curved undersurface or saddle 72, at the inlet end of the through bore 74, that is adapted to be snugly engaged with, and solvent welded to, a plastic main 76. The service line 78 is connected to the lateral outlet 80 by being solvent welded into a counterbore in the boss 82 surrounding such outlet. The upper end of the through bore 74 is provided with a short smooth-surfaced section 84 and interior threads 86 extend from the lower end of such section downwardly past the lateral outlet 80 to terminate at an upwardly-facing downwardly-inclined shoulder 88 in the bore. Below the shoulder 88, the bore 74 is smooth-surfaced. After the T 70 has been solvent welded to the main 76, and the service line 78 solvent welded to the T, a hole 89 is drilled or cut in the main in alignment with the bore 74 by means of operations conducted without escape of fluid from the main to the atmosphere by equipment known in the art that is secured to the upper end of the T. After service has thus been established by the creation of the opening 89 in the main 76, an assembly 90 embodying this invention is inserted in the T 70, again by equipment of the type well-known in the art.

The assembly 90 includes a generally cylindrical plastic member 92 that is exteriorly threaded for a major portion of its length for engagement with the threads 86 in the T bore 74. The member 92 includes a flow passage 94 and lateral ports 96 for providing communication between the main 76 and the service line 78 in the manner described above with regard to FIGURE 1. The member 92 also carries a valve seat 98, ball valve 100, and permanent magnet 102, also substantially identical with those described above with reference to FIGURE 1. In the embodiment of the invention shown in FIGURE 4, however, the magnet 102 can be retained in place in the member 92 by means of a heat-forming operation, as contrasted to a spinning or crimping operation. The lower end of the member 92 is somewhat reduced to provide a downwardly-facing shoulder 104 engageable with the upwardly-facing shoulder 88 in the T bore 74 to provide a seal therebetween. Above its exterior threads, the member 92 is provided with a smooth exterior surface and a circumferential groove in which is disposed a sealing ring 106, similar to the sealing ring 38 of the embodiment of FIGURE 1, and which effects a seal with the smooth-surfaced section 84 of the T bore 74. The installation is completed by a plastic closure cap 108.

Referring now to FIGURE 5 of the drawings there is shown a curb valve T embodying this invention. The T includes a metal body 110 which may be connected to a street main and a service line in the manner described above with reference to FIGURE 1, e.g., as by welding. Below a lateral outlet 112 the T bore 114 is provided with a short smooth-surfaced cylindrical section 116 of reduced diameter terminating at its upper end in an upwardly-facing shoulder defining a valve seat 118. Above the section 116 the T bore 114 is provided with interior threads 120. Engaged with the interior threads 120 in the T bore 114 are exterior threads 122 on a valve member 124 provided, below its exterior threads, with a downwardly-tapering annular surface 126 seatable upon the upwardly facing valve seat 118, by appropriate threading rotation of the valve member, in order to shut off flow from a main to a service line, neither of which is shown. Above its threads 122 the valve member 124 is provided with an elongated reduced valve stem 127 which projects out of the upper end of the T through bore 114 and through a complementary bore in a closure cap 128. Desirably, a seal is effected between the valve stem 127 and the cap 128, as by means of an O-ring 130 disposed in a circumferential groove in the cap bore and snugly embracing the cylindrical valve stem 127. Additionally, a seal desirably is provided between the cap 128 and the T 110, as by means of an O-ring 132 disposed in an annular groove in the inner surface of the cap and sealingly engaged with the upper end of the T body. An upwardly-facing shoulder 134 on the valve member 124 engages the undersurface of the cap 128 when the valve member is in its upper or outermost position, shown in FIGURE 5.

Secured to the outer end of the valve stem 127, as by a set screw 136, is an operating head 138 having a flattened portion 140 for engagement by an appropriate wrench (not shown). The outer end of the valve stem 127 also is provided with an interiorly threaded socket 142 by means of which the valve member 124 is attached to an appropriate tool (not shown) for inserting the valve member in the T 110, by means of appropriate apparatus known in the art, after main-drilling operations have been completed in order to establish service.

The valve member 124, below the annular surface 126, is provided with an extension 144 having an open lower or forward end, a flow passage 146, lateral ports 148, a valve seat 150, a ball valve 152, and permanent magnet 154, substantially identical to the construction described above with regard to FIGURE 1, in order to provide such extension with an excessive-flow safety valve. The lateral ports 148 are positioned immediately below the annular surface 126 on the valve member 124, so that when the valve member is completely unseated, as shown in FIGURE 5, flow can take place through the passageway 146 and the lateral ports 148 into the T lateral outlet 112, but when the valve member is screwed downwardly so that the annular surface 126 engages with the seat 118, in the T, such flow will be shut off. The lower end of the extension 144 is of substantially the same diameter as the reduced bore section 116, and a sliding seal is effected therebetween, as by an O-ring 156 disposed in a circumferential groove in the reduced bore section and snugly embracing the lower end of the extension. A somewhat better arrangement (not shown) from the standpoint of facilitating assembly and preventing displacement of the O-ring 156 by fluid flow, is to locate the O-ring in a circumferential groove in the lower end of the extension 144 for sliding and sealing engagement with the reduced bore section 116.

Above its lower end, the extension 144 is provided with a section 158 of reduced diameter that is somewhat longer than the length of the reduced bore section 116, so that such reduced extension section 158 will overlap the reduced bore section, at both ends of the latter, as the annular surface 126 of the valve member 124 approaches sealing engagement with the T seat 118. In this position of the valve member 124, it will be seen that an annular unsealed passageway will be provided between the extension 144 and the reduced bore section 116 so that flow can be by-passed around the passageway 146. Such by-passing of flow will equalize any pressure differential existing across the ball valve 152 by reason of the latter's engagement with its seat 150, and thus permit the valve 152 to be drawn away from its seat by a combination of gravity and magnetic forces, to thus reset the excessive flow safety valve.

The bodies of metal service T's and curb valve T's usually are formed of iron or steel, a magnetic material. Consequently, in the embodiments illustrated in FIGURES 1 to 3 and 5, the parts carrying the magnet are formed of nonmagnetic material, preferably brass. If such parts, i.e., member 36 or valve member 124, are formed of iron or steel then the magnets must be insulated therefrom, as by being enclosed in a sleeve of nonmagnetic material, e.g., brass, aluminum or even plastic.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. A service T comprising: a T body having a through bore and a lateral outlet, one end of said bore constituting an inlet, said bore having a threaded section and a smooth-surfaced section; an assembly constituting a plug for the other end of said bore and an excessive-flow safety valve comprising an elongated member extending from one side of said lateral outlet to the other and threadedly engaged with said bore threaded section, said member having an open end facing said inlet, a closed end blocking the other end of said bore, and a flow passage extending inwardly from said open end and terminating in at least one lateral port in communication with said lateral outlet, a valve seat in said passage remote from said member open end, a valve element in said passage engageable with said seat to shut off flow through said passage, means normally retaining said valve element out of engagement with said seat and responsive to excessive flow past said valve element to release the latter for movement by the flow of fluid in said passage into sealing engagement with said seat and for maintenance of said engagement by the resulting pressure differential across said valve element; and means for effecting a seal between said member and said bore on opposite sides of said lateral outlet.

2. The structure defined in claim 1 in which the engaged threads in the threaded bore section and on the member are tapered and constitute the means for effecting a seal between said member and bore on one side of the lateral outlet.

3. The structure defined in claim 1 in which the means effecting a seal between the member and the bore on one side of the lateral outlet includes a circumferential groove in one of the opposed surfaces of said member and of the smooth-surfaced bore section and a sealing gasket in said groove and protruding therefrom into engagement with the other of said surfaces.

4. The structure defined in claim 1 in which the means effecting a seal between the member and the bore on one side of the lateral outlet comprises a tapered shoulder on one of the opposed surfaces of said member and bore engaged with a confronting shoulder on the other surface.

5. The structure defined in claim 1 in which the body is provided with exterior means at one end thereof for fastening thereto apparatus through which an inserting and extracting tool may be manipulated and the corresponding end of the member is provided with threads and a noncircular configuration adapted to be engaged by such tool for installing the assembly in the bore.

6. The structure defined in claim 1 including an annular shoulder in the bore on one side of and facing the lateral outlet and defining a valve seat, an annular shoulder on the member between the closed end thereof and the lateral port seatable on said seat to shut off flow from one end of said bore to said outlet, the engaging threads in said bore and on said member serving, on rotation of the latter, to effect seating or unseating axial adjustment of said member.

7. The structure defined in claim 6 in which the smooth-surfaced bore section is between the bore shoulder and the bore one end and the means for effecting the seal on one side of the outlet includes a circumferential groove in one of the opposed surfaces of said smooth-surfaced bore section and said member and a sealing gasket in said groove and protruding therefrom into engagement with the other of said surfaces.

8. The structure defined in claim 7 in which the member includes a section of reduced transverse dimension opposed to and overlapping both ends of the smooth-surfaced bore section, when the member shoulder approaches the bore shoulder, in order to by-pass flow around the passage and permit equalization of pressure on both sides of the valve member so that the latter can be moved off its seat.

9. A service T comprising: a T body having a through bore and a lateral outlet, one end of said bore constituting an inlet, said bore having a threaded section between said inlet and said outlet and a smooth-surfaced section between said outlet and the other end of said bore; an assembly constituting a plug for the other end of said bore and an excessive-flow safety valve assembly comprising an elongated member threadedly engaged with said threaded bore section and extending from one side of said outlet to the other, said member having an open end facing said inlet, a closed end blocking said other bore end, and a flow passage extending inwardly from said open end and terminating in at least one lateral port in communication with said lateral outlet, a valve seat in said passage remote from said open end, a valve element in said passage seatable on said seat to shut off flow through said passage, and means carried by said member normally retaining said valve element unseated and responsive to excessive flow past said element to release the latter for movement by the flow of fluid into seating engagement with said seat and maintenance of said engagement by the resulting pressure differential across said valve element; and means for effecting a seal between said member and said smooth-surfaced bore section.

10. The structure defined in claim 9 in which the means for effecting a seal includes a pressure-deformable resilient packing ring carried in a circumferential groove in the member and engaged with the smooth-surfaced bore section.

11. The structure defined in claim 9 in which the engaged threads in the bore and on the member are tapered to effect a seal.

12. The structure defined in claim 9 including a tapered shoulder on one of the opposed surfaces of the bore and the member between the inlet and lateral outlet and a shoulder on the other of said surfaces engaged with said tapered shoulder to effect a seal between said bore and member.

13. The structure defined in claim 9 in which the valve-element-retaining means includes a permanent magnet.

14. A curb valve T comprising: a T body having a through bore and a lateral outlet, one end of said bore constituting an inlet, said bore having a threaded section between said outlet and the other end of said bore and a reduced section between said inlet and outlet forming a shoulder defining a valve seat facing said inlet; a valve member having an annular surface seatable on said seat and threadedly engaged with said threaded bore section for axial adjustment; a stem on said member projecting out of said other bore end; an extension on said member projecting beyond said annular surface and having a flow passage extending inwardly from the forward end of said extension and terminating in a lateral port, between said forward end and said annular surface, in communication with said lateral outlet when said member is unseated; a valve seat in said passage remote from said extension forward end; a valve element in said passage seatable on said seat therein to shut off flow therethrough; means carried by said extension normally retaining said valve element unseated and responsive to excessive flow past said element to release the latter for movement by the flow into seating engagement with said passage seat and maintenance of such engagement by the resulting pressure differential across said element; and gasket means for effecting a sliding seal between said extension and said reduced bore section.

15. The structure defined in claim 14 in which the extension, between its forward end and the annular surface, is provided with a section of reduced diameter of less length than the reduced bore section and overlapping both ends of the latter when the valve member approaches seating engagement with the bore seat to provide a by-pass for flow from the inlet to the lateral outlet around the passage to equalize the pressure differential across the valve element when the latter is seated.

16. The structure defined in claim 14 in which the retaining means includes a permanent magnet.

17. An excessive-flow safety valve comprising: a hollow valve body having a flow passage therethrough and terminating at one end in a tubular section constituting an inlet to said passage; an outwardly facing shoulder at the inlet end of said section; a valve seat in said passage spaced from said inlet; a magnetic ball valve seatable on said seat to control flow through said passage; and a generally U-shaped permanent magnet disposed in said section and retained therein by the engagement of the inner ends of the arms of said magnet with said shoulder and the inturning of the material of the rim of said section over the base of said magnet, a sleeve frictionally engaged between the curved base of the magnet and the wall of the tubular section to retain said magnet in place while the rim of said section is turned in, said wall being normally retained in engagement with said arms and spaced from said seat but responsive to excessive flow in said passage to overcome the retaining force of said magnet and to move by the flow into engagement with said seat to shut off flow through said passage.

References Cited by the Examiner
UNITED STATES PATENTS

| | | | |
|---|---|---|---|
| 1,739,864 | 12/29 | Schardein | 137—454.5 |
| 2,172,345 | 9/39 | Bucknell et al. | 137—454.5 |
| 2,179,144 | 11/39 | Buttner | 137—517 |
| 2,569,316 | 9/51 | Jerman | 137—517 |
| 2,784,933 | 3/57 | Newell et al. | 251—330 XR |
| 2,923,318 | 2/60 | Monson | 137—45.46 |
| 2,939,475 | 6/60 | Roach | 251—65 XR |
| 3,037,521 | 6/62 | Larry | 251—330 XR |

ISADOR WEIL, *Primary Examiner.*